United States Patent
Lee et al.

(10) Patent No.: US 10,349,386 B2
(45) Date of Patent: *Jul. 9, 2019

(54) METHOD AND APPARATUS OF ALLOCATING UPLINK FEEDBACK CHANNEL FOR FEEDING DATA CORRESPONDING TO AN ENHANCED-PHYSICAL DOWNLINK CONTROL CHANNEL (E-PDCCH)

(71) Applicants: Samsung Electronics Co., Ltd., Suwon-si, Gyeonggi-do (KR); Industry-University Cooperation Foundation Korea Aerospace University, Goyang-si, Gyeonggi-do (KR)

(72) Inventors: Heun Chul Lee, Pocheon-si (KR); Bruno Clerckx, Seoul (KR); Young Ho Jung, Goyang-si (KR)

(73) Assignees: Samsung Electronics Co., Ltd., Suwon-si (KR); Industry-University Cooperation Foundation Korea Aerospace University, Goyang-si (KR)

( * ) Notice: Subject to any disclaimer, the term of this patent is extended or adjusted under 35 U.S.C. 154(b) by 809 days.

This patent is subject to a terminal disclaimer.

(21) Appl. No.: 14/223,225

(22) Filed: Mar. 24, 2014

(65) Prior Publication Data

US 2014/0204883 A1 Jul. 24, 2014

Related U.S. Application Data

(63) Continuation of application No. 13/216,573, filed on Aug. 24, 2011, now Pat. No. 8,681,726.

(30) Foreign Application Priority Data

Feb. 17, 2011 (KR) .................. 10-2011-0014159

(51) Int. Cl.
*H04W 72/04* (2009.01)
*H04L 1/18* (2006.01)
*H04L 5/00* (2006.01)

(52) U.S. Cl.
CPC ....... *H04W 72/0406* (2013.01); *H04L 1/1861* (2013.01); *H04L 1/1864* (2013.01); *H04L 5/001* (2013.01); *H04L 5/0055* (2013.01)

(58) Field of Classification Search
CPC ..... H04L 1/1858; H04L 5/0007; H04L 5/001; H04L 1/1621; H04L 5/0055
(Continued)

(56) References Cited

U.S. PATENT DOCUMENTS

2006/0079264 A1* 4/2006 Gu .................. H04W 52/12
455/522
2009/0285160 A1* 11/2009 Cheng .................. H04L 1/1854
370/328

(Continued)

FOREIGN PATENT DOCUMENTS

| CN | 101222291 A | 7/2008 |
|---|---|---|
| CN | 101442818 A | 5/2009 |

(Continued)

OTHER PUBLICATIONS

InterDigital Communications, et al., "PUCCH resource assignment with channel selection", 3GPP TSG RAN WG 1 Meeting #63bis, R 1-11 0113, Jan. 17-21, 2011 (3 pages, in English).

(Continued)

*Primary Examiner* — Sai Aung
(74) *Attorney, Agent, or Firm* — Jefferson IP Law, LLP

(57) ABSTRACT

Provided is an uplink feedback channel allocation method and apparatus used to feedback data to indicate whether data packets corresponding an enhanced physical downlink control channel (E-PDCCH) were successfully decoded. A (Continued)

terminal may use an additional resource area of an uplink feedback channel or may use an empty resource area of the uplink feedback channel to which feedback information of a data packet corresponding to a physical downlink control channel (PDCCH) is not allocated, to perform feedback.

20 Claims, 14 Drawing Sheets

(58) Field of Classification Search
USPC .......................................... 370/328, 329, 330
See application file for complete search history.

(56) References Cited

U.S. PATENT DOCUMENTS

| | | |
|---|---|---|
| 2010/0165847 A1 | 7/2010 | Kamuf et al. |
| 2010/0208629 A1 | 8/2010 | Ahn et al. |
| 2010/0260116 A1* | 10/2010 | Imamura ............. H04W 72/082 370/329 |
| 2010/0272048 A1 | 10/2010 | Pan et al. |
| 2010/0322114 A1* | 12/2010 | Li ........................ H04L 5/0053 370/278 |
| 2011/0249633 A1* | 10/2011 | Hong .................... H04L 5/0053 370/329 |
| 2012/0039285 A1* | 2/2012 | Seo ...................... H04L 1/1671 370/329 |
| 2012/0113941 A1* | 5/2012 | Chung ............. H04W 72/1289 370/329 |
| 2012/0134333 A1* | 5/2012 | Nakao .................. H04L 1/0029 370/329 |
| 2012/0182914 A1* | 7/2012 | Hariharan ............. H04L 1/1614 370/311 |
| 2012/0300722 A1* | 11/2012 | Kim ...................... H04L 1/1861 370/329 |
| 2012/0307755 A1* | 12/2012 | Kim ...................... H04L 1/1854 370/329 |

FOREIGN PATENT DOCUMENTS

| | | |
|---|---|---|
| CN | 101448332 A | 6/2009 |
| KR | 10-2007-0011030 A | 1/2007 |
| KR | 10-2009-0107559 A | 10/2009 |
| KR | 10-2010-0056962 A | 5/2010 |
| KR | 10-2010-0107393 A | 10/2010 |
| KR | 10-2010-0112286 A | 10/2010 |
| KR | 10-2010-0115320 A | 10/2010 |
| WO | 2010/110598 A2 | 9/2010 |

OTHER PUBLICATIONS

Intel Corporation (UK) Ltd., "Resource Allocation for PUCCH Format 1 b with Channel Selection", 3GPP TSG RAN WG1 Meeting #63bis, R1-11 0254, Jan. 17-21, 2011 (4 pages, in English).
Pantech, "UL PUCCH A/N resource allocation for CA", 3GPP TSG RAN WG1 Meeting #62, R1-104632, Aug. 23-27, 2010 (4 pages, in English).
International Search Report dated Apr. 24, 2012 in counterpart International Application No. PCT/KR2011/008003 (3 pages, in English).
Samsung, "PUCCH HARQ-ACK Resource Indexing for DL CA", 3GPP TSG RAN WG1 #61, R1-103002, May 10-14, 2010, pp. 1-3.

* cited by examiner

FIG. 4
Downlink Carrier 1
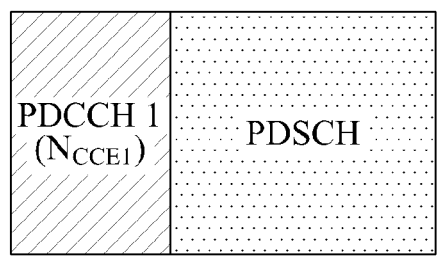
Downlink Carrier 2
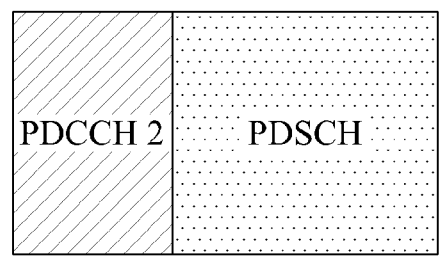
Uplink Carrier 1
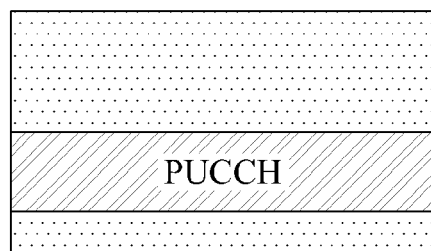
Uplink Carrier 2
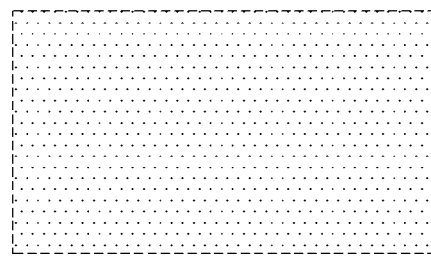

METHOD AND APPARATUS OF ALLOCATING UPLINK FEEDBACK CHANNEL FOR FEEDING DATA CORRESPONDING TO AN ENHANCED-PHYSICAL DOWNLINK CONTROL CHANNEL (E-PDCCH)

CROSS-REFERENCE TO RELATED APPLICATION(S)

This is a continuation application of a prior application Ser. No. 13/216,573, filed Aug. 24, 2011, claims the benefit under 35 U.S.C. § 119(a) of a Korean patent application No. 10-2011-0014159, filed on Feb. 17, 2011, in the Korean Intellectual Property Office, the entire disclosure of which is incorporated herein by reference for all purposes.

BACKGROUND

1. Field

The following description relates to an uplink feedback channel allocation method and apparatus that allocates an uplink feedback channel for performing feedback. The feedback may be used to indicate whether data packets corresponding to an enhanced-physical downlink control channel (E-PHCCH) are successfully decoded.

2. Description of Related Art

In a third generation partnership project (GPP) long-term evolution (LTE) system, a base station transmits a data packet to each terminal via a physical downlink shared channel (PDSCH) of a downlink frame. The base station transmits resource allocation information associated with the data packet via a physical downlink control channel (PDCCH).

One problem that may occur is that the terminal may not be able to successfully decode a data packet received from the base station. In order for a base station to be made aware of whether a data packet was successfully decoded, a large amount of overhead may be generated. The overhead reduces the overall efficiency of the system.

SUMMARY

In one general aspect, there is provided a communication method of a terminal that performs feedback as to whether decoding of data packets was successful in a wireless communication system, the method including obtaining an uplink feedback channel that includes resource areas that are respectively mapped to indices of control channel elements (CCEs) that are included in at least two different resource allocation control channels, wherein the respective CCEs each have different indices, allocating information that is associated with whether decoding of a data packet transmitted by a base station was successful, to a resource area of the uplink feedback channel that is mapped to a CCE aggregation to which control information of the data packet is transmitted, and feeding back, to the base station, the information that is associated with whether the decoding of the data packet was successful, using the resource area of the uplink feedback channel.

The at least two different resource allocation control channels may comprise a physical downlink control channel (PDCCH) and an enhanced PDCCH (E-PDCCH).

The at least two different resource allocation control channels may each comprise PDCCHs that each correspond to a carrier for multi-carrier transmission.

The allocating may comprise allocating information that is associated with whether the decoding of the data packet was successful, to the resource area of the uplink feedback channel, which is mapped to an initial index from among indices of at least one CCE included in the CCE aggregation.

The information that is associated with whether the decoding of the data packet was successful may comprise one of an acknowledgement (ACK) response if the decoding was successful and a negative acknowledgement (NACK) if the decoding was unsuccessful for a hybrid automatic repeat request (HARQ).

When one of the at least two different resource allocation control channels obtains a spatial multiplexing gain (SMG), the obtaining may comprise obtaining the uplink feedback channel additionally including resource areas, the number of the resource areas being equal to a product of a number of at least one layer added for spatial multiplexing and a number of CCEs of the resource allocation control channel that obtains the SMG, and the allocating may comprise allocating the information that is associated with whether the decoding of the data packet was successful to the additionally included resource areas in response to the data packet being associated with the at least one layer added for the spatial multiplexing.

When one of the at least two different resource allocation control channels obtains a SMG, the allocating may comprise allocating the information that is associated with whether the decoding of the data packet was successful to the resource area of the uplink feedback channel, which is mapped to a sum of an initial index from among indices of the at least one CCE included in the CCE aggregation and an offset of a layer associated with the data packet, in response to the data packet being associated with at least one layer added for spatial multiplexing.

The offset may be determined, in advance, based on an index of the added at least one layer.

In another aspect, there is provided a communication method of a terminal that performs feedback as to whether decoding of data packets was successful in a wireless communication system, the method including obtaining an uplink feedback channel including resource areas that are respectively mapped to indices of control channel elements (CCEs) of a resource allocation control channel that includes a largest number of CCEs from among at least two different resource allocation control channels, allocating information that is associated with whether decoding of a data packet transmitted by a base station was successful, to a resource area of the uplink feedback channel, based on an offset that is associated with the data packet and an initial index from among indices of at least one CCE included in a CCE aggregation to which control information with respect to the data packet is transmitted, and feeding back, to the base station, the information that is associated with whether the decoding of the data packet was successful, using the uplink feedback channel.

Each of the resource allocation control channels may include a plurality of CCEs of which indices are sequential from 1 to a number of CCEs included in a corresponding resource allocation control channel.

The allocating may comprise allocating the information that is associated with whether the decoding of the data packet was successful to the resource area of the uplink feedback channel, which is mapped to a sum of the offset of the data packet and the initial index from among the indices of the at least one CCE included in the CCE aggregation to which the control information of the data packet is transmitted.

The at least two different resource allocation control channels may comprise a first resource allocation control channel and a second resource allocation control channel, and the allocating may comprise allocating the information that is associated with whether the decoding of the data packet was successful to a resource area of the uplink feedback channel, which is mapped to the initial index from among the indices of the at least one CCE included in the CCE aggregation to which the control information of the data packet is transmitted, in response to the data packet being associated with the first resource allocation control channel, and allocating the information that is associated with whether the decoding of the data packet was successful to a resource area of the uplink feedback channel, which is mapped to a sum of the offset of the data packet and the initial index from among the indices of at least one CCE included in the CCE aggregation to which the control information of the data packet is transmitted, in response to the data packet being associated with the second allocation control channel.

The at least two different resource allocation control channels may comprise a downlink physical control channel (PDCCH) and an enhanced PDCCH (E-PDCCH).

The at least two different resource allocation control channels may each comprise PDCCHs that correspond to two multi-carriers.

In another aspect, there is provided a communication method of a base station that transmits control information with respect to data packets using a first resource allocation control channel and a second resource allocation control channel in a wireless communication system, the method including generating offsets with respect to mapping relations between resource areas of an uplink feedback channel of a terminal and information that is associated with whether decoding of data packets associated with the second resource allocation control channel was successful, to enable resource areas of the uplink feedback channel associated with the first resource allocation control channel and resource areas of the uplink feedback channel associated with the second resource allocation control channel, to not overlap each other, and transmitting the offsets to the terminal.

The resource areas of the uplink feedback channel associated with the first resource allocation channel may be used to feedback data indicating whether data packets associated with the first resource allocation channel were successfully decoded, and the resource areas of the uplink feedback channel associated with the second resource allocation channel may be used to feedback data indicating whether data packets associated with the second resource allocation channel were successfully decoded.

The transmitting may comprise transmitting each of the offsets, to the terminal, based on a CCE aggregation to which a corresponding data packet is allocated.

The first resource allocation control channel may correspond to a PDCCH and the second resource allocation control channel may correspond to an E-PDCCH.

The base station may use a multi-carrier transmission scheme, and the first resource allocation control channel and the second resource allocation control channel may correspond to a PDCCH that correspond to a first carrier and a PDCCH that corresponds to a second carrier, respectively.

In another aspect, there is provided a computer-readable storage medium having stored therein program instructions to cause a processor to implement a communication method of a terminal that performs feedback as to whether decoding of data packets was successful in a wireless communication system, the method including obtaining an uplink feedback channel that includes resource areas that are respectively mapped to indices of control channel elements (CCEs) that are included in at least two different resource allocation control channels, wherein the respective CCEs each have different indices, allocating information that is associated with whether decoding of a data packet transmitted by a base station was successful, to a resource area of the uplink feedback channel that is mapped to a CCE aggregation to which control information of the data packet is transmitted, and feeding back, to the base station, the information that is associated with whether the decoding of the data packet was successful, using the resource area of the uplink feedback channel.

In another aspect, there is provided a terminal to receive information from a base station via a downlink channel and to feed back information to the base station via an uplink channel, the terminal including a receiver configured to receive uplink channel information that includes resource areas that are mapped to indices of control channel elements (CCEs) included a downlink channel, a controller configured to allocate acknowledgement information to the resource areas included in the uplink control channel, the acknowledgment information indicating whether a data packet received via the downlink channel was successfully decoded, and a transmitter to feed back the acknowledgment information to the base station via the allocated resource areas of the uplink control channel.

The uplink control channel may comprise a physical uplink control channel (PUCCH) in a third generation partnership project (3GPP) long-term evolution (LTE) environment.

The uplink channel may comprise a plurality of resource areas that are one-to-one mapped to the indices of the CCEs included in the downlink channel.

The terminal may share the uplink channel with at least one other terminal, and the receiver may be further configured to receive an offset from the base station to prevent the controller from allocating a resource area that is to be used by the at least one other terminal.

The receiver may be configured to receive the data packet from the base station via a physical downlink shared channel (PDSCH) of a downlink frame, to receive resource allocation information associated with the data packet via a physical downlink control channel (PDCCH), and the offset may be received in a downlink control information (DCI) field that is received via the PDCCH.

Other features and aspects may be apparent from the following detailed description, the drawings, and the claims.

BRIEF DESCRIPTION OF THE DRAWINGS

FIG. 4 is a diagram illustrating an example of a downlink transmission frame and an uplink transmission frame of a 3GPP LTE advanced system that supports multi-carrier transmission.

Figure 1:
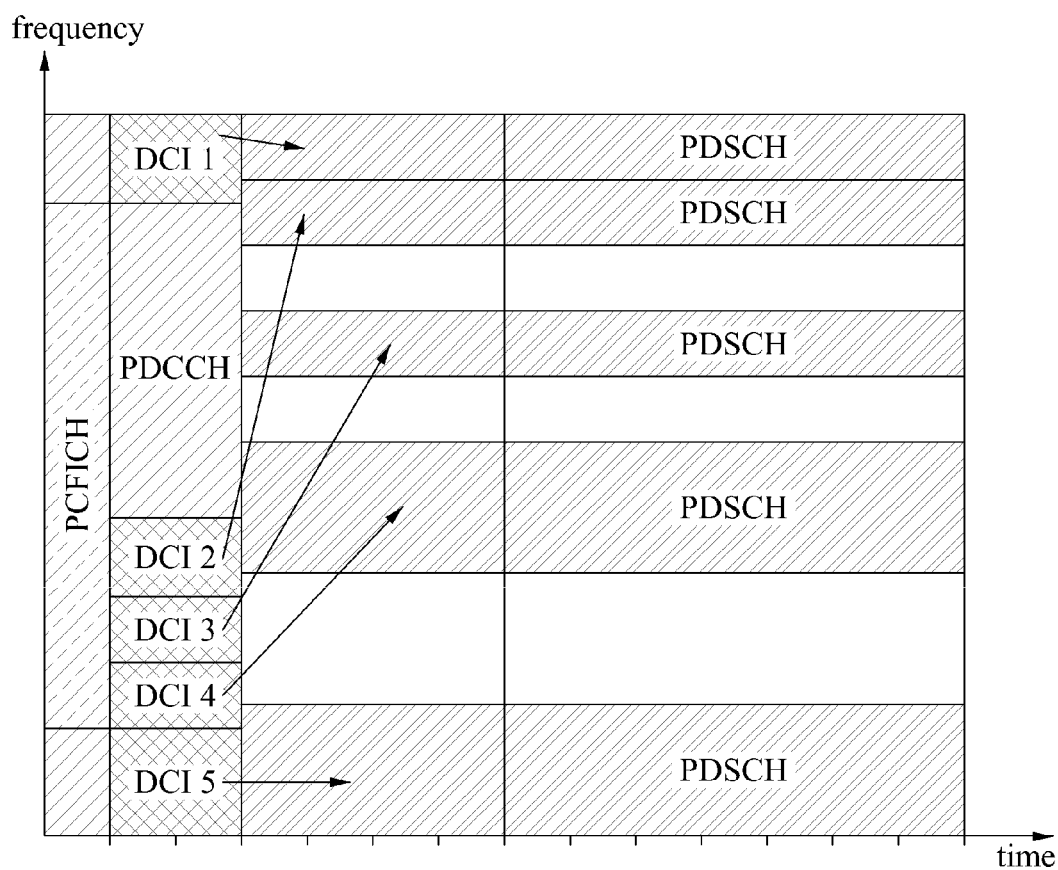
FIG. 1 is a diagram illustrating an example of a downlink transmission frame based on a third generation partnership project (GPP) long-term evolution (LTE) system.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

A base station in an advanced communication system, for example, a third generation partnership project (3GPP) long-term evolution (LTE) advanced system, may continuously support a terminal in a general communication system such as a 3GPP LTE system, and may simultaneously support a terminal based on an advanced communication standard such as the 3GPP LTE advanced system.

According to various examples herein, the base station may use an enhanced physical downlink control channel (E-PDCCH) for transmission of resource allocation information that is associated with a data packet. The base station may also transmit, to a terminal, information that is associated with an allocation method of allocating an uplink feedback channel. For example, the uplink channel may be a physical uplink control channel (PUCCH). The PUCCH may be used by the terminal to feed back information about whether a data packet corresponding to the resource allocation information transmitted via the E-PDCCH was successfully decoded.

Accordingly, the terminal may feed back decoding information via the allocated PUCCH based on the uplink channel information received from the base station. In this example, the information may be used to indicate whether the decoding of the data packet corresponding to the resource allocation information transmitted via the E-PDCCH was successful. For example, the information used to indicate whether the data packet was successfully decoded may be one of an acknowledgement (ACK) response or a negative acknowledgement (NACK) for a hybrid automatic repeat request (HARQ).

While the examples herein describe a base station that continuously supports a terminal in the 3GPP LTE system and simultaneously supports an enhanced terminal in the 3GPP LTE advanced system, the examples are not limited to the 3GPP LTE advanced system.

FIG. 1 illustrates an example of a downlink transmission frame based on a 3GPP LTE system.

Referring to FIG. 1, a base station may transmit a data packet to a terminal via a physical downlink shared channel (PDSCH). Resource allocation information such as control information of the PDSCH may be included in downlink control information (DCI) that is transmitted via the PDCCH. For example, a DCI may be mapped to one or more control channel elements (CCEs), for example, one, two, four, or eight CCEs. In various examples, a CCE is a physical resource unit used for mapping resource allocation information.

The terminal may compare an identification (ID) of the terminal with ID information. For example, the terminal may compare a cell radio network temporary identifier (C-RNTI) of the terminal included in a cyclic redundancy checking (CRC) of the DCI, and may obtain resource allocation information that is associated with a data packet that is allocated to the corresponding terminal. The terminal may attempt to decode the PDSCH based on the resource allocation information.

As an example, if a HARQ scheme is applied, the terminal may transmit information associated with whether the decoding of the data packet transmitted via the PDSCH was successful. The terminal may transmit the decoding information to a base station. For example, the terminal may transmit acknowledgement (ACK) or negative acknowledgement (NACK) information via an uplink HARQ ACK and NACK feedback channel.

To decrease overhead of the base station with respect to the control information, information that is associated with an uplink feedback channel to be used by the terminal may not be transmitted to the terminal using a separate control message, and the terminal may allocate the ACK or NACK information to the uplink feedback channel, based on a predetermined algorithm. For example, the terminal may obtain, in advance, resource areas of the uplink feedback channel which are respectively mapped to CCEs. The terminal may allocate ACK or NACK information of the data packet, to a resource area of the uplink feedback channel which is mapped to a CCE that has an initial index from among CCEs to which control information of the data packet is transmitted.

In this example, the overhead of the base station used for transmitting an uplink feedback channel allocating method may decrease. However, a number of CCEs used for DCI transmission may be greater than or equal to two, and several resource areas from among the resource areas of the uplink feedback channel obtained in advance may not be used and may remain empty.

Figure 2:
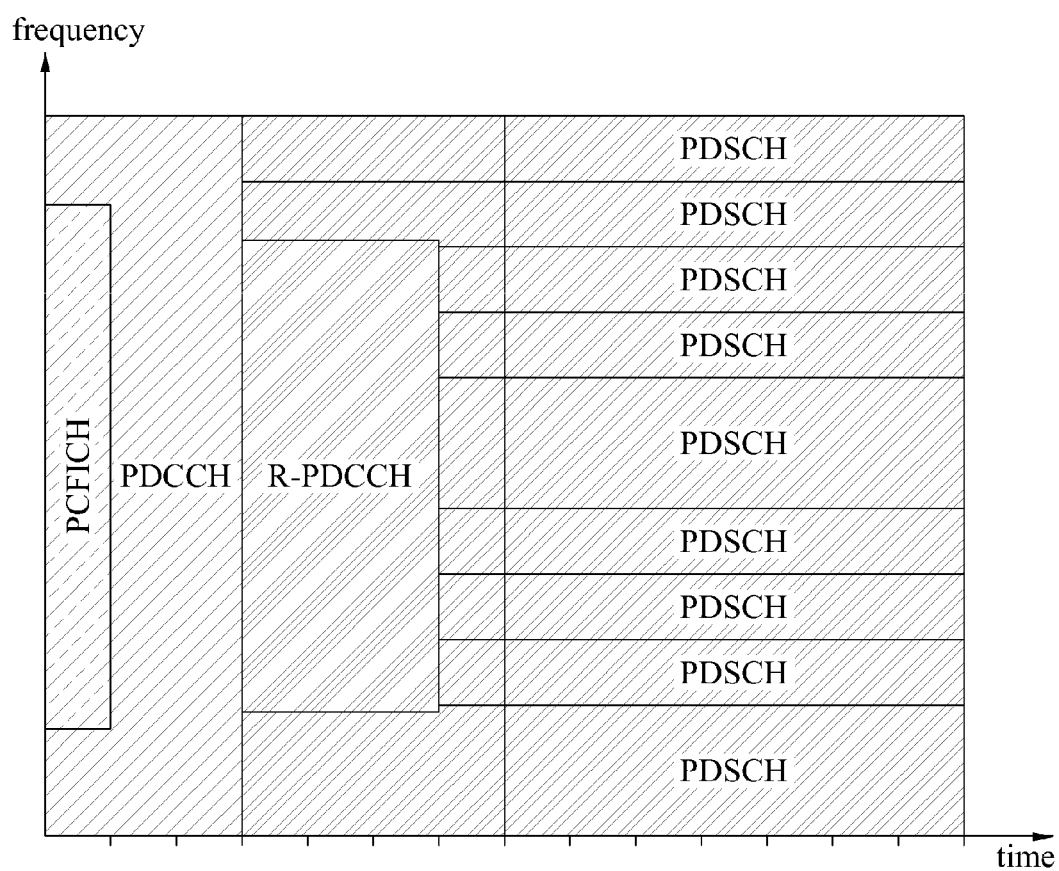
FIG. 2 is a diagram illustrating an example of a downlink transmission frame for supporting a relay node in a 3GPP LTE advanced system.
Figure 3:
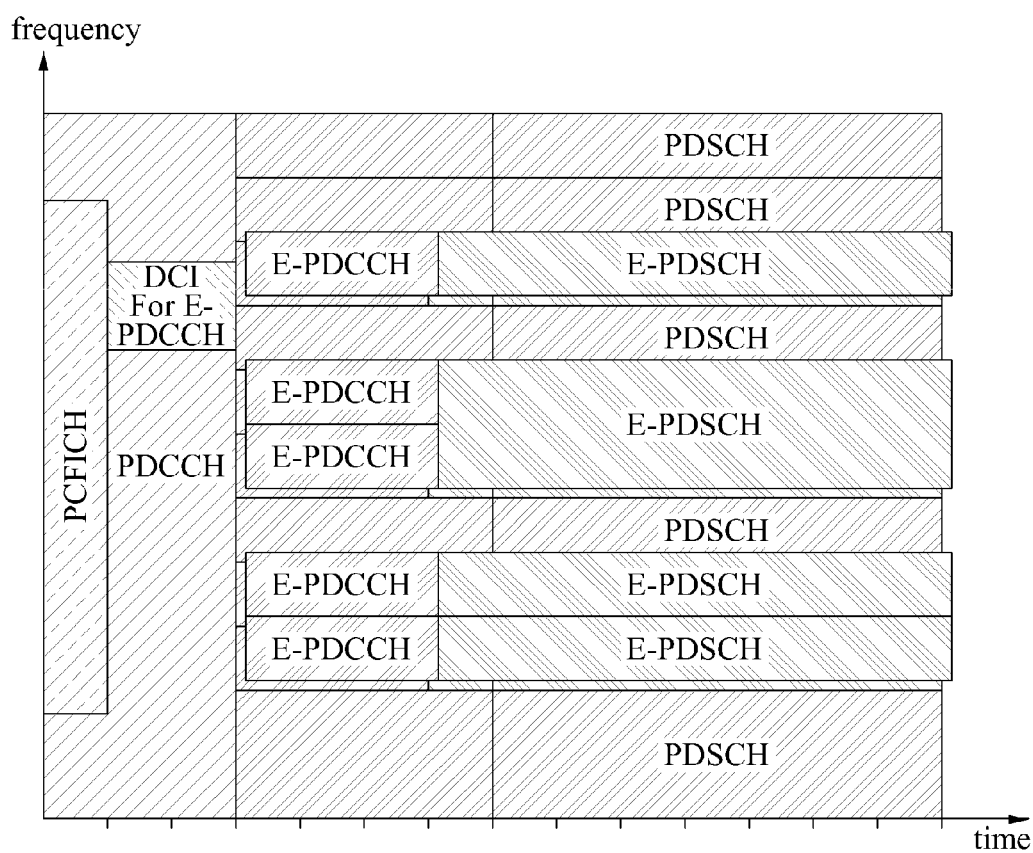
FIG. 3 is a diagram illustrating an example of a downlink transmission frame in which an enhanced-physical downlink control channel (E-PDCCH) for obtaining a spatial multiplexing gain (SMG) is transmitted in a 3GPP LTE advanced system.

In the 3GPP LTE advanced system which is more advanced than the 3GPP LTE system, the base station may transmit additional control information using a portion of the PDSCH in the 3GPP LTE system, for example, using resource areas that are used for transmitting the data packet as shown in FIG. 2 and FIG. 3.

FIG. 2 illustrates an example of a downlink transmission frame for supporting a relay device in a 3GPP LTE advanced system.

Referring to FIG. 2, the 3GPP LTE advanced system may transmit a Relay-packet data control channel (R-PDCCH) that corresponds to an additional downlink resource allocation control channel to support a relay device that uses a PDSCH area of a 3GPP LTE system.

FIG. 3 illustrates an example of a downlink transmission frame in which an enhanced-physical downlink control channel (E-PDCCH) for obtaining a spatial multiplexing gain (SMG) is transmitted in a 3GPP LTE advanced system.

Referring to FIG. 3, the 3GPP LTE advanced system may transmit an E-PDCCH using a PDSCH area of the 3GPP LTE system. In this example, the E-PDCCH corresponds to an additional downlink resource allocation control channel that obtains a spatial-multiplexing gain (SMG) to increase a capacity of a control channel.

Referring to FIG. 3 and FIG. 4, an uplink feedback channel for feedback of HARQ ACK or NACK information of a data packet of which resource allocation information is transmitted via a PDCCH may be defined in advance. The uplink feedback channel may be used to feedback ACK and NACK information. However, a method of allocating, to the uplink feedback channel, the HARQ ACK or NACK information via an R-PDCCH or an E-PDCCH may be needed.

When an uplink feedback channel allocation method is transmitted to the terminal using higher layer signaling, overhead of the base station may increase. Therefore, there is a desire for an uplink feedback channel allocation method that does not increase overhead.

FIG. 4 illustrates an example of a downlink transmission frame and an uplink transmission frame of a 3GPP LTE advanced system that supports multi-carrier transmission.

Referring to FIG. 4, a multi-carrier transmission scheme that transmits a data packet to a terminal using at least two carriers may be used in a downlink transmission. In this example, HARQ ACK or NACK information of a data packet of which resource allocation information is transmitted via a PDCCH1 of a downlink carrier 1 may be allocated to an uplink feedback channel. For example, a PUCCH, of an uplink carrier 1 may be mapped to the downlink carrier 1.

In this example, a new allocation method may be used to allocate HARQ ACK or NACK information of a data packet of which resource allocation information is transmitted via a PDCCH 2 of a downlink carrier 2. The allocation method of allocating the HARQ ACK or NACK information of the data packet of which the resource allocation information is transmitted via the PDCCH 2 of the downlink carrier 2 may be explicitly transmitted to the terminal. In this example, overhead of a base station may increase.

Therefore, a method of minimizing overhead of the base station that transmits an ACK or NACK information allocation method is provided.

In this example, i) a conventional resource allocation control channel and ii) an additional resource allocation channel exist together. Accordingly, an allocation method that allocates, to the uplink feedback channel, ACK or NACK information of a data packet of which resource allocation information is transmitted via the additional resource allocation control channel may be performed while maintaining a structure of the uplink feedback channel corresponding to the conventional resource allocation control channel.

The allocation method may be classified into three methods as follows.

1. An Example of a Method Using Resource Areas of Additional Uplink Feedback Channel (Method 1)

The terminal may obtain resource areas of the uplink feedback channel. The number of the resource areas may be equal to a sum of a number of CCEs corresponding to at least two different resource allocation control channels. The terminal may allocate ACK or NACK information to a resource area of the uplink feedback channel corresponding to a data packet, based on a conventional uplink feedback channel allocation method. In this example, an index of a first CCE of the additional resource allocation control channel, such as, the R-PDCCH of FIG. 2, the E-PDCCH of FIG. 3, and the PDCCH2 of FIG. 4, may be determined as a next value of an index of a last CCE of the conventional PDCCH.

2. An Example of a Method Using Empty Resource Area of a Conventional Uplink Feedback Channel (Method 2)

First, the terminal may obtain resource areas of the uplink feedback channel. The number of the resource areas may be equal to a number of CCEs that are greatest from among respective numbers of CCEs of at least two resource allocation control channels. The terminal may allocate ACK or NACK information of a data packet of which resource allocation information is transmitted via the PDCCH, based on the conventional uplink feedback channel allocation method.

The terminal may allocate ACK or NACK information of a data packet of which resource allocation is transmitted via the additional resource allocation control channel, and also based on the conventional uplink feedback channel allocation method. However, the ACK or NACK information may already be allocated to a corresponding resource area of the uplink feedback channel. Therefore, if the base station transmits resource allocation information via the additional resource allocation control channel, the base station may additionally transmit an offset between a resource area that is associated with the conventional uplink feedback channel allocation method and a resource area to which ACK or NACK information is actually allocated. Based on the offset to the uplink feedback channel, the terminal may allocate the ACK or NACK information.

3. An Example of a Method for Spatial Multiplexing Transmission (Method 3)

In the additional resource allocation control channel, resource allocation information of a plurality of data packets may be transmitted through the same CCEs, based on spatial multiplexing transmission. In this example, if the conventional uplink feedback channel allocation method is used, ACK or NACK information for each of the plurality of data packets may be allocated to the same resource area of the uplink feedback channel.

In this example, the resource area to which the ACK or NACK information for each of the plurality of data packets is allocated may be a resource area that is mapped to a CCE that has an initial index from among CCEs that are included in a CCE aggregation to which the resource allocation information of the plurality of data packets is transmitted.

If a CCE aggregation level, for example, if a number of CCEs included in the CCE aggregation is greater than or equal to two, resource areas of the uplink feedback channel which are mapped to remaining CCEs excluding the CCE that has the initial index, may be empty. Therefore, the ACK or NACK information of the plurality of data packets may be sequentially allocated to the uplink feedback channel without overlapping, based on spatial multiplexing layer indices. In this example, the base station may not transmit separate information associated with allocation of the uplink feedback channel.

Method 3 may be used in conjunction with the method 1 or the method 2.

Examples of method 1 through method 3 are described with reference to FIG. 5 through FIG. 10.

Figure 5:
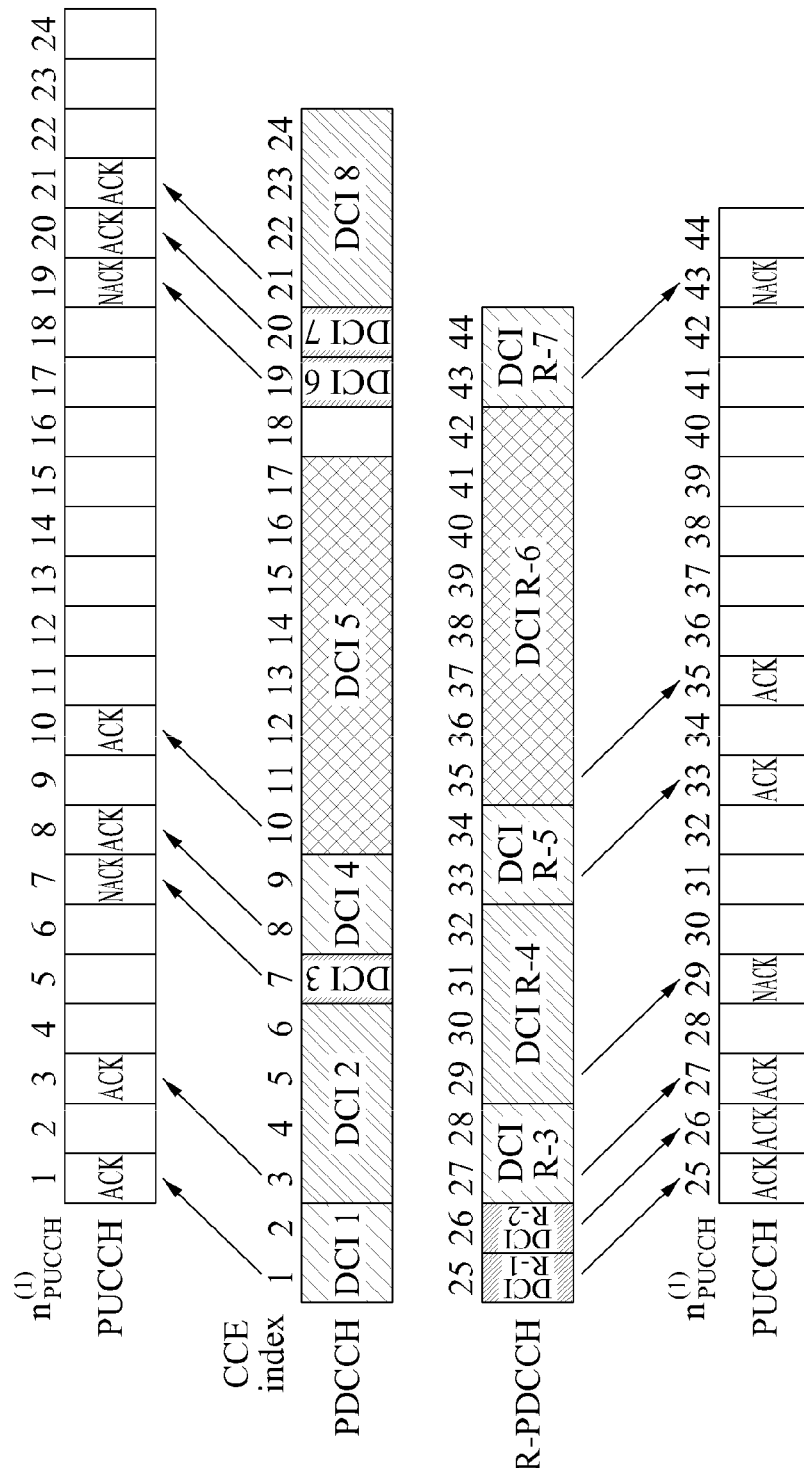
FIG. 5 is a diagram illustrating an example of an acknowledgement (ACK) and a negative acknowledgement (NACK) of a data packet of which resource allocation information is transmitted through a Relay-physical downlink control channel (R-PDCCH).

FIG. 5 illustrates an example of allocating ACK or NACK information of a data packet of which resource allocation information is transmitted through an R-PDCCH.

The example of FIG. 5 is associated with method 1, and may use resource areas of an uplink feedback channel. In this example, the number of the resource areas is equal to a sum of a number of CCEs corresponding to resource allocation control channels.

In this example, a number of CCEs used by a PDCCH is $N_{CCE1}$ a number of CCEs used by the R-PDCCH is $N_{CCE2}$, and the resource areas of the uplink feedback channel, which are one-to-one mapped to $N_{CCE}$ CCEs, are used. In this example, $N_{CCE}=N_{CCE1}+N_{CCE2}$.

In this example, a terminal may allocate ACK or NACK information of a data packet without transmitting separate information associated with an uplink feedback channel allocation. In this example, an index of a first CCE of the R-PDCCH is determined as a next value of an index of a last CCE of the PDCCH.

Referring to FIG. 5, $N_{CCE1}$ is 24 as shown by CCEs 1 through 24, $N_{CCE2}$ is 20 as shown by CCEs 25 through 44, and $N_{CCE}$ is 44. Therefore, the terminal may obtain resource areas of the PUCCH, which are one-to-one mapped to 44 CCEs. The terminal may allocate ACK or NACK information to a resource area of the PUCCH that is mapped to an index of a CCE to which resource allocation information associated with a data packet is transmitted.

For example, ACK or NACK information of a data packet associated with DCI1 of the PDCCH may be allocated to a resource area 1 that corresponds to a resource area of the PUCCH that is mapped to a CCE index 1. ACK or NACK information of a data packet associated with DCI R-1 of the R-PDCCH may be allocated to a resource area 25 corresponding to a resource area of the PUCCH that is mapped to a CCE index 25.

In this example, $n^{(1)}_{PUCCH}$ denotes an index of a resource area of the PUCCH.

Accordingly, ACK or NACK information of all data packets may be allocated to the PUCCH without collision, and overhead of the base station due to allocation of the ACK or NACK information is not increased.

Figure 6:
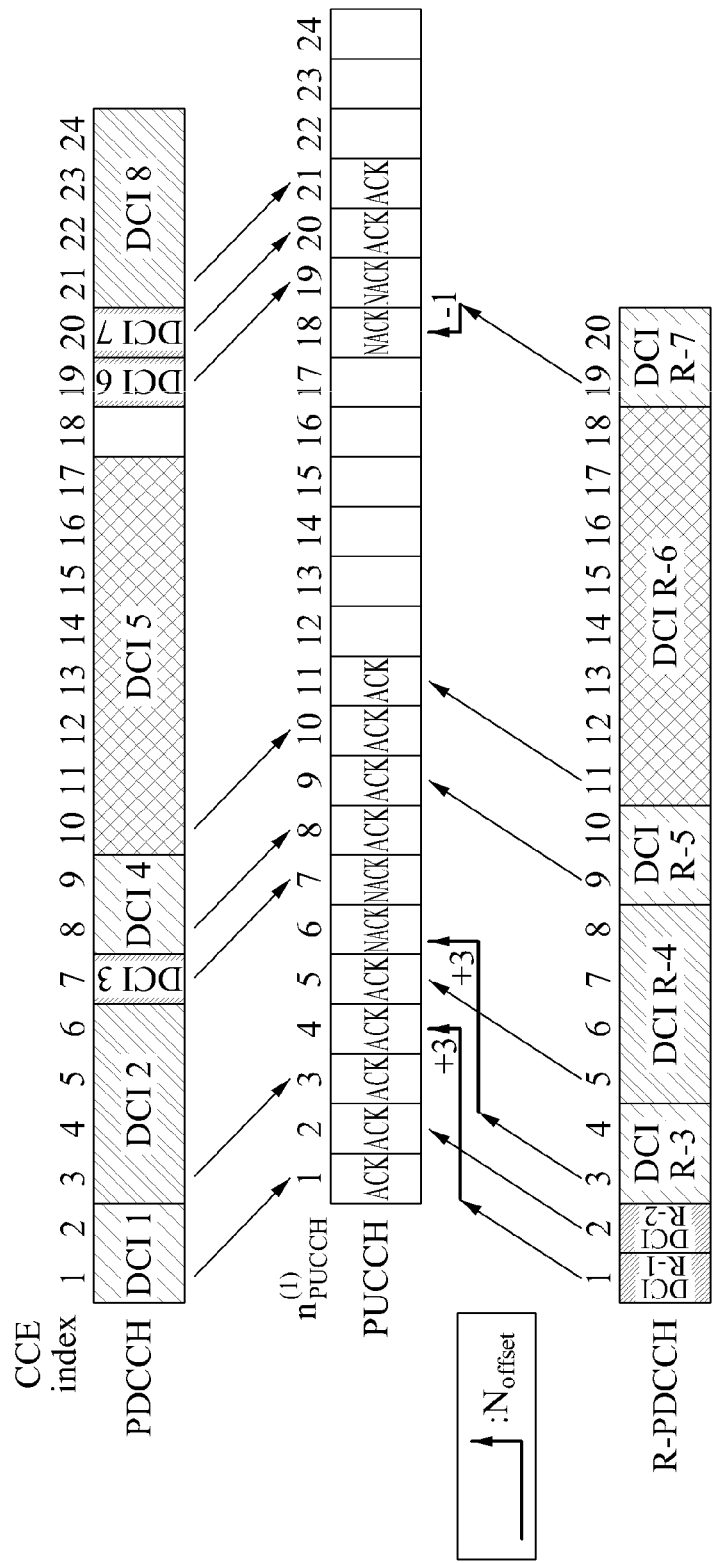
FIG. 6 is a diagram illustrating another example of an ACK and a NACK of a data packet of which resource allocation information is transmitted through an R-PDCCH.

FIG. 6 illustrates another example of allocating ACK or NACK information of a data packet of which resource allocation information is transmitted through an R-PDCCH.

The example of FIG. 6 is associated with method 2, and an offset ($N_{offset}$) between a resource area associated with the conventional uplink feedback channel allocation method and a resource area to which ACK or NACK information is actually allocated is transmitted from a base station to a terminal.

In this example, a number of CCEs used by a PDCCH is $N_{CCE1}$, a number of CCEs used by the R-PDCCH is $N_{CCE2}$, and resource areas of the uplink feedback channel, which are one-to-one mapped to $N_{CCE}$ CCEs, are used. In this example, $N_{CCE}=\max(N_{CCE1}+N_{CCE2})$.

ACK or NACK information of a data packet associated with the PDCCH may be allocated to a PUCCH based on the conventional uplink feedback channel allocation method. Accordingly, an $N_{offset}$ may not be transmitted from the base station.

ACK or NACK information of a data packet associated with the R-PDCCH may be allocated to the PUCCH based on Equation 1.

$$n_{PUCCH}^{(1)}=n_{CCE}+N_{PUCCH}^{(1)}+N_{offset} \quad \text{[Equation 1]}$$

In Equation 1, $n^{(1)}_{PUCCH}$ denotes an index of a resource area of the PUCCH and $n_{CCE}$ denotes an index of a CCE that has an initial index in a CCE aggregation associated with a corresponding data packet. $N^{(1)}_{PUCCH}$ denotes a constant that adjusts mapping relations between indices of CCEs and indices of resource areas of the PUCCH, and may be configured in advance by higher layers. Referring to FIG. 6, $N^{(1)}_{PUCCH}$ corresponds to zero. Accordingly, the index of the CCE of the PDCCH may be mapped to the same index of the resource area of the PUCCH.

$N_{offset}$ is an off-set value that adjusts a mapping relation between the resource area that is associated with the conventional uplink feedback channel allocation method and the resource area to which ACK or NACK information is actually allocated, and may be determined for each data packet. The $N_{offset}$ may be a variable that prevents the ACK or NACK information of a data packet associated with the R-PDCCH from being allocated to the same resource area as a resource area as the ACK or NACK information of a data packet associated with the PDCCH is allocated. The $N_{offset}$ enables the ACK or NACK information of the data packet associated with the R-PDCCH to be allocated to an empty resource area of the PUCCH.

In this example, $N_{offset}$ may be included in a new field of DCI that is transmitted via the R-PDCCH, for example, a HARQ feedback channel offset field.

Table 1 illustrates an example of a relation between $N_{offset}$ and a value of HARQ feedback channel offset field.

TABLE 1

| H-ARQ feedback channel offset field | $N_{offset}$ |
|---|---|
| 000 | −4 |
| 001 | −3 |
| 010 | −2 |
| 011 | −1 |
| 100 | 0 |
| 101 | 1 |
| 110 | 2 |
| 111 | 3 |

Referring to FIG. 6, in the case of DCI R-2, DCI R-4, DCI R-5, and DCI R-6, DCI transmission of the PDCCH does not start from a CCE of the PDCCH that has the same index as an index of a CCE that has an initial index in a corresponding CCE aggregation. Therefore, $N_{offset}$ of data packets associated with the DCI R-2, the DCI R-4, the DCI R-5, and the DCI R-6 may be zero.

In the case of DCI R-1, DCI R-3, and DCI R-7, DCI transmission of the PDCCH starts from a CCE of the PDCCH that has the same index as an index of a CCE that has an initial index in a corresponding CCE aggregation. Therefore, $N_{offset}$ of data packets associated with the DCI R-1, the DCI R-3, and the DCI R-7 may be determined as shown in Table 2.

TABLE 2

|  | DCI R-1 | DCI R-3 | DCI R-7 |
| --- | --- | --- | --- |
| $N_{offset}$ | +3 | +3 | −1 |
| H-ARQ feedback channel offset field | 111 | 111 | 011 |

In this example, the terminal may allocate the ACK or NACK information of data packets that are associated with the R-PDCCH to resource areas to which the ACK or NACK information of data packets associated with the PDCCH are not allocated. Therefore, overhead of the uplink feedback channel may decrease and usage efficiency of the uplink feedback channel may be improved.

As another example, if an available resource area of the PUCCH does not exist even though an offset within a given range is used, a resource area of the PUCCH with respect to a corresponding data packet may be allocated using a separate higher layer signaling.

Figure 7:
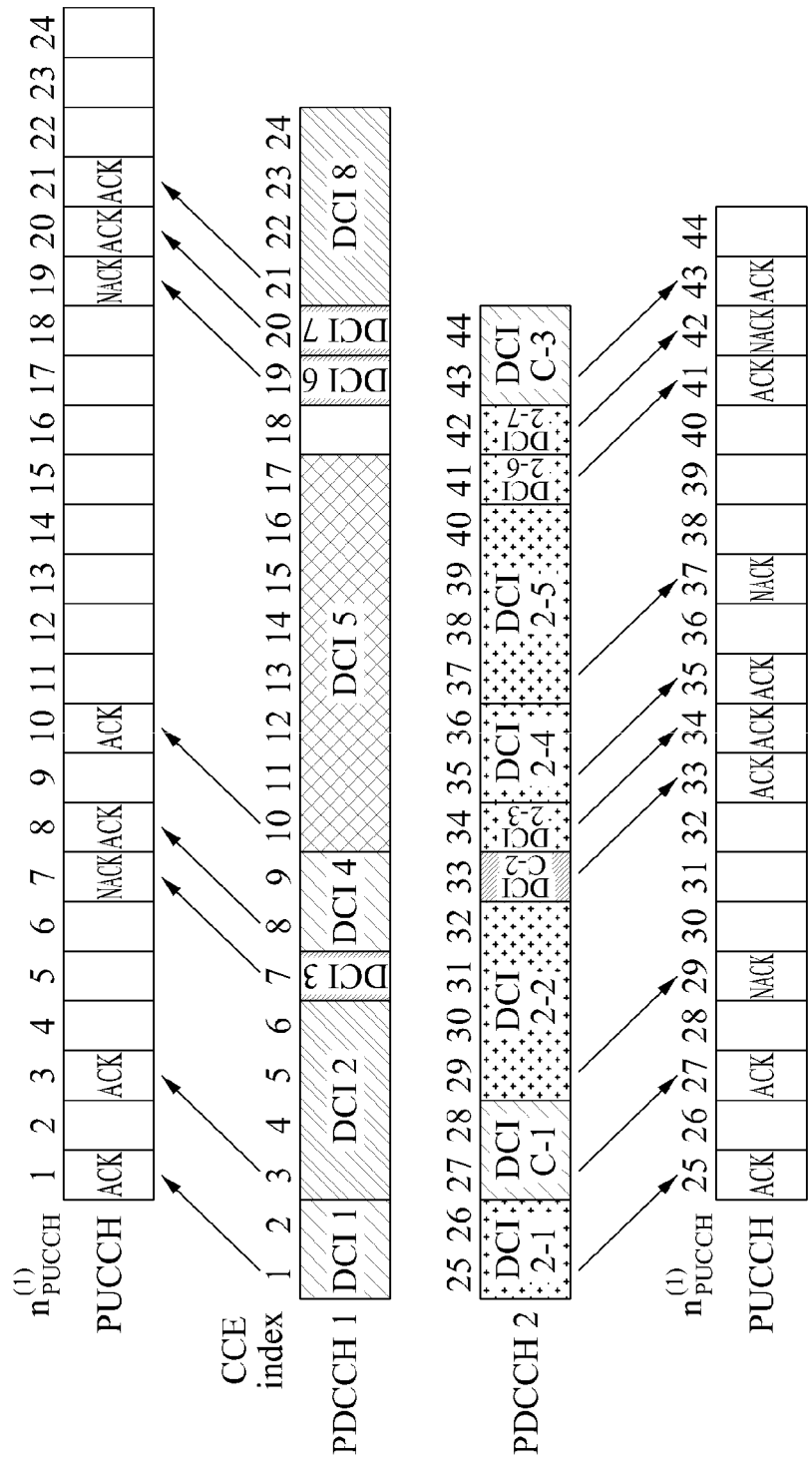
FIG. 7 is a diagram illustrating an example of allocating ACK or NACK information of a data packet in a system that supports multi-carrier transmission.

FIG. 7 illustrates an example of allocating ACK or NACK information of a data packet in a system that supports multi-carrier transmission.

The example of FIG. 7 is associated with method 1, and may use resource areas of an uplink feedback channel. In this example, the number of the resource areas is equal to a sum of a number of CCEs corresponding to resource allocation control channels respectively corresponding to carriers.

In this example, a number of CCEs used by a PDCCH1 corresponding to a conventional resource allocation control channel is $N_{CCE1}$, a number of CCEs used by a PDCCH2 corresponding to an additional resource allocation control channel is $N_{CCE2}$, and resource areas of a PUCCH that to the uplink feedback channel are used. In this example, $N_{CCE}=N_{CCE1}+N_{CCE2}$. ACK or NACK information of data packets associated with the PDCCH2 may also be allocated to the PUCCH. In this example, cross-carrier allocation may be performed.

In this example, the terminal may allocate ACK or NACK information of a data packet without transmitting separate information associated with the uplink feedback channel allocation. In this example, an index of a first CCE of the PDCCH 2 may be determined as a next value of an index of a last CCE of the PDCCH1.

An ACK or NACK information allocation method may be the same as the allocation method associated with FIG. 5.

Figure 8:
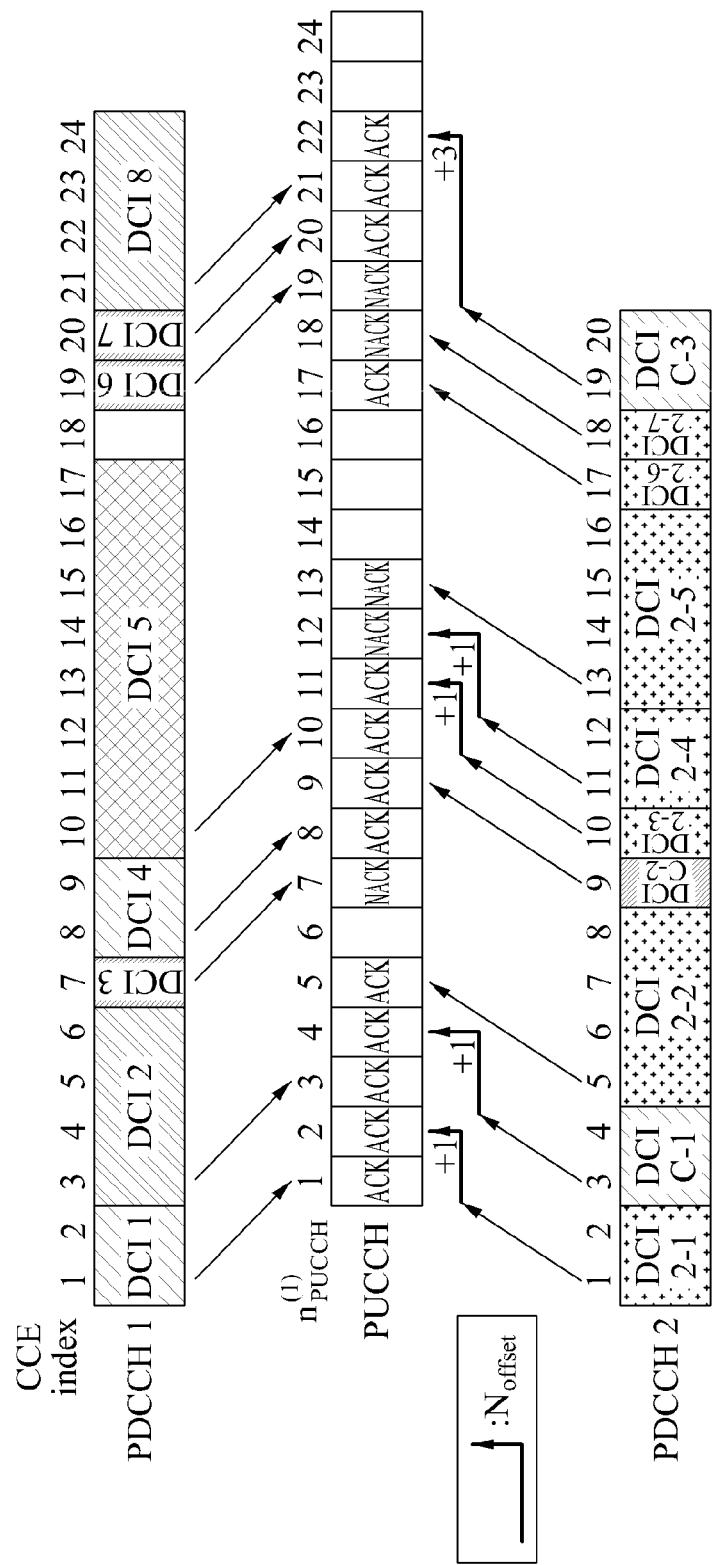
FIG. 8 is a diagram illustrating another example of allocating ACK or NACK information of a data packet in a system that supports multi-carrier transmission.

FIG. 8 illustrates another example of allocating ACK or NACK information of a data packet in a system that supports multi-carrier transmission.

The example of FIG. 8 is associated with method 2, and $N_{offset}$ between a resource area associated with the conventional uplink feedback channel allocation method and a resource area to which ACK or NACK information is actually to be allocated may be transmitted from a base station to a terminal.

In this example, a number of CCEs used by a PDCCH1 is $N_{CCE1}$, a number of CCEs used by a PDCCH2 corresponding to a carrier added by multi-carrier transmission is $N_{CCE2}$, and resource areas of an uplink feedback channel are used. In this example, $N_{CCE}=\max(N_{CCE1}+N_{CCE2})$, and the PUCCH is the uplink feedback channel corresponding to a carrier of the PDCCH1. ACK or NACK information of data packets associated with the PDCCH2 may also be allocated to the PUCCH. In this example, cross-carrier allocation may be performed.

The ACK or NACK information of the data packet associated with the PDCCH2 may be allocated to the PUCCH based on Equation 2.

$$n_{PUCCH}^{(1)} = n_{CCE} + N_{PUCCH}^{(1)} + N_{offset} \qquad \text{[Equation 2]}$$

In Equation 2, $n^{(1)}_{PUCCH}$ denotes an index of a resource area of the PUCCH and $n_{CCE}$ denotes an index of a CCE that has an initial index in a CCE aggregation that is associated with a corresponding data packet. $N_{offset}$ denotes an offset, and may be included in a new field of DCI transmitted via the PDCCH 2, for example, a HARQ feedback channel offset field.

Referring to FIG. 8, in the case of DCI C-2, DCI transmission of the PDCCH1 does not start from a CCE of the PDCCH1 that has the same index as an index of a CCE that has an initial index in a corresponding CCE aggregation. Therefore, $N_{offset}$ of a data packet associated with the DCI C-2 may be zero.

In respective cases of DCI C-1 and DCI C-3, DCI transmission of the PDCCH1 starts from a CCE of the PDCCH1 that has the same index as an index of a CCE that has an initial index in a corresponding CCE aggregation. Therefore, $N_{offset}$ of the data packets associated with the DCI C-1 and the DCI C-3 may be determined as shown in Table 3.

TABLE 3

|  | DCI C-1 | DCI C-3 |
| --- | --- | --- |
| $N_{offset}$ | +1 | +3 |
| H-ARQ feedback channel offset field | 101 | 111 |

The same method may be applicable to remaining DCI2 of the PDCCH2.

The terminal may allocate ACK or NACK information of data packets associated with the PDCCH 2 to resource areas to which the ACK or NACK information of data packets associated with the PDCCH1 are not allocated. Therefore, overhead of the uplink feedback channel may decrease and usage efficiency of the uplink feedback channel may be improved.

As another example, if an available resource area of the PUCCH does not exist even though an offset within a given range is used, a resource area of the PUCCH with respect to a corresponding data packet may be allocated using a separate higher layer signaling.

Figure 9:
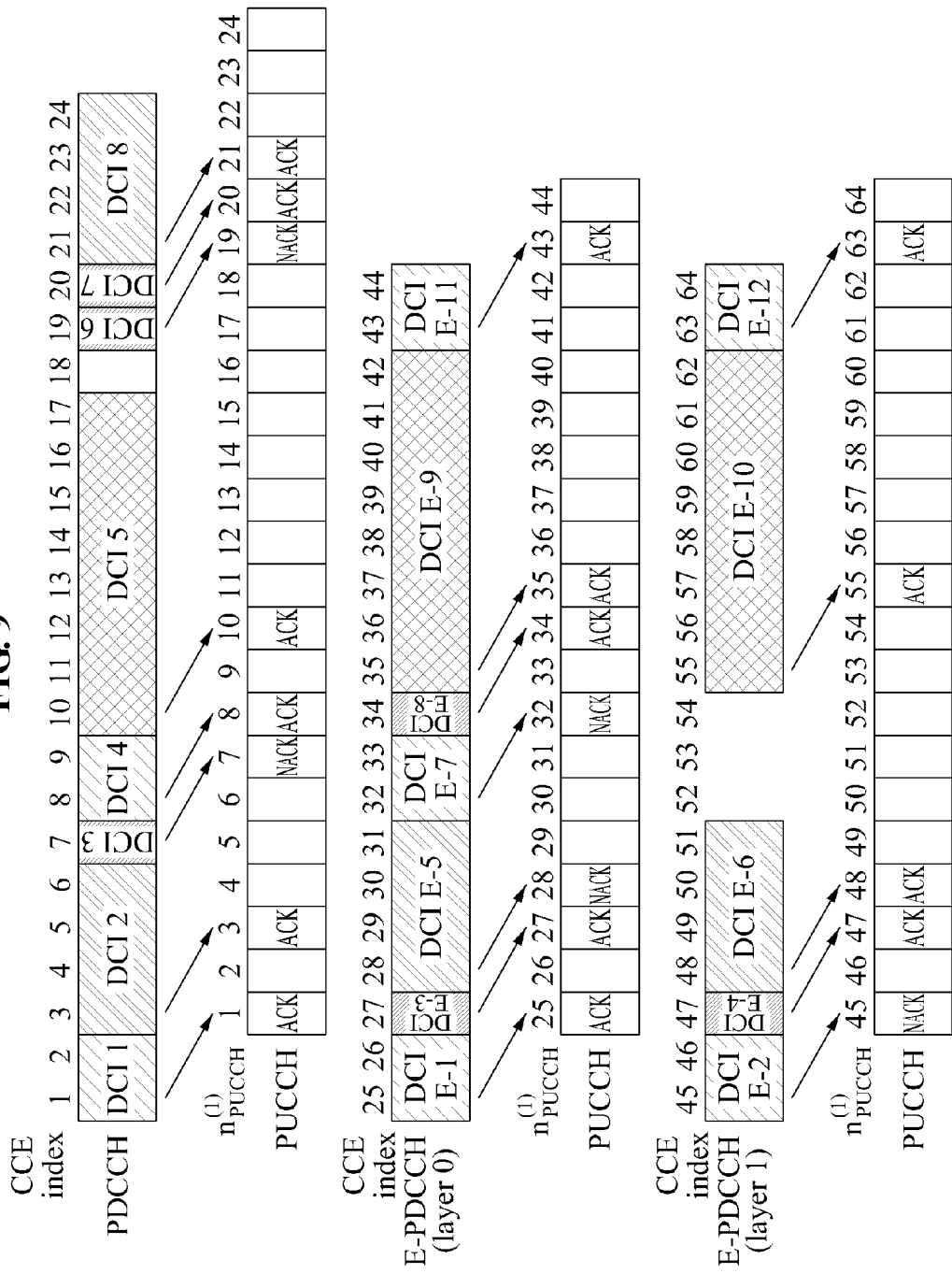
FIG. 9 is a diagram illustrating an example of allocating ACK or NACK information of a data packet of which resource allocation information is transmitted through an E-PDCCH to which a spatial multiplexing scheme is applied.

FIG. 9 illustrates an example of allocating information associated with an ACK and a NACK of a data packet of which resource allocation information is transmitted through an enhanced-PDCCH (E-PDCCH) to which a spatial multiplexing scheme is applied.

The example of FIG. 9 is associated with method 3, and may use resource areas of an uplink feedback channel. In this example, the number of the resource areas is equal to a sum of a number of CCEs corresponding to resource allocation control channels, for example, a PDCCH and the E-PDCCH.

In this example, a number of CCEs used by the PDCCH is $N_{CCE1}$, a number of CCEs used by the E-PDCCH is $N_{CCE2}$, a number of spatial multiplexing layers of the E-PDCCH is $N_{SDMA}$, and resource areas of the uplink feedback channel are used. In this example, $N_{CCE}=N_{CCE1}+(N_{SDMA}\times N_{CCE2})$.

In this example, the terminal may allocate ACK or NACK information of a data packet without transmitting separate information associated with the uplink feedback channel allocation. In this example, an index of a CCE of a first layer may be determined as a next value of an index of a last CCE of the PDCCH. An index of a CCE of a second layer of the E-PDCCH may be determined as a next value of an index of a last CCE of a first layer of the E-PDCCH. Even though CCEs corresponding to the layers of the E-PDCCH may be physically the same, different indices may be used for the layers for each of descriptions.

For example, the indices of the CCEs of the E-PDCCH may be determined in an order of physical resource as illustrated in FIG. 9 or may be determined in an order of spatial multiplexing layer.

For example, if four physical CCEs exist and two spatial multiplexing layers exist, and an index of a first CCE of the E-PDCCH is 25, indices of CCEs may be determined as shown in Table 4 and Table 5. Table 4 shows the indices of the CCEs that are determined in the order of physical resources and Table 5 shows the indices of the $CCE_S$ that are determined in the order of spatial multiplexing layer.

TABLE 4

|  | Layer 1 | Layer 2 |
| --- | --- | --- |
| CCE1 | 25 | 29 |
| CCE2 | 26 | 30 |
| CCE3 | 27 | 31 |
| CCE4 | 28 | 32 |

TABLE 5

|  | Layer 1 | Layer 2 |
| --- | --- | --- |
| CCE1 | 25 | 26 |
| CCE2 | 27 | 28 |
| CCE3 | 29 | 30 |
| CCE4 | 31 | 32 |

Figure 10:
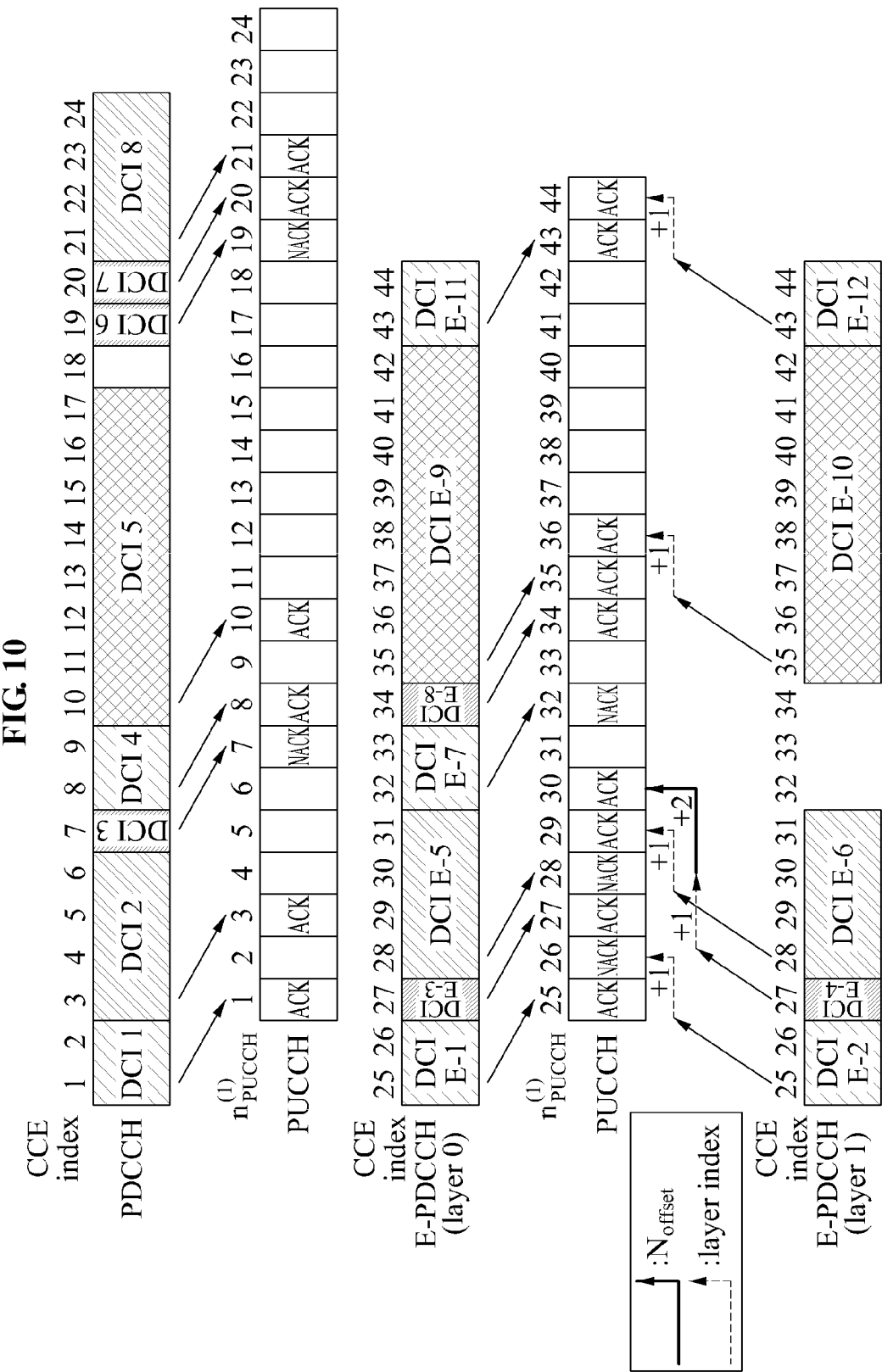
FIG. 10 is a diagram illustrating another example of allocating ACK or NACK information of a data packet of which resource allocation information is transmitted through an E-PDCCH to which a spatial multiplexing scheme is applied.

FIG. 10 illustrates another example of allocating ACK or NACK information of a data packet of which resource allocation information is transmitted through an E-PDCCH to which a spatial multiplexing scheme is applied.

The example of FIG. 10 is associated with method 3, and may use resource areas of an uplink feedback channel. In this example, a number of resource areas is equal to a sum of a number of CCEs of a PDCCH and a number of CCEs of the E-PDCCH.

In this example, a number of CCEs used by the PDCCH is $N_{CCE1}$, a number of CCEs used by the E-PDCCH is $N_{CCE2}$, a number of spatial multiplexing layers of the E-PDCCH is $N_{SDMA}$, and resource areas of the uplink feedback channel are used. In this example, $N_{CCE}=N_{CCE1}+N_{CCE2}$.

For example, an ACK or NACK information allocation method that allocates ACK or NACK information of a data packet associated with a PDCCH may be the same as the ACK or NACK information allocation method of FIG. 9. An index of a first CCE of the E-PDCCH may be determined as a next value of an index of a last CCE of the PDCCH.

In the case of the E-PDCCH, ACK or NACK information for each of a plurality of data packets may be allocated to the same resource area of the uplink feedback channel. An example of a method that does not use an additional resource area of the PUCCH is described.

(1) number of spatial multiplexing layers of corresponding DCI≤CCE aggregation level ($N_{CCE\_agg}$)

In this example, ACK or NACK information of a data packet associated with the E-PDCCH is allocated to the PUCCH based on Equation 3. (DCI E-1, DCI E-2), (DCI E-5, DCI E-6), (DCI E-7), (DCI E-8), (DCI E-9, DCI E-10), and (DCI E-11, DCI E-12) are included in this case.

$$n_{PUCCH}^{(1)}=n_{CCE}+N_{PUCCH}^{(1)}+l(l=0,\ldots,N_{SDMA}-1) \quad \text{[Equation 3]}$$

In Equation 3, l denotes a spatial multiplexing layer index.

Referring to FIG. 9, in the case of the DCI E-1 and the DCI E-2, $N_{CCE\_agg}$ is 2 and the number of the spatial multiplexing layers is 2. Accordingly, ACK or NACK information of data packets corresponding to the DCI E-1 and the DCI E-2 are allocated to $$n_{PUCCH}^{(1)}=25+N_{PUCCH}^{(1)} \text{ and } n_{PUCCH}^{(1)}=25+N_{PUCCH}^{(1)}+1,$$

respectively, without increasing overhead of the base station due to the ACK or NACK information allocation.

(2) number of spatial multiplexing layers of corresponding DCI>$N_{CCE\_agg}$

DCI E-3 and DCI E-4 are included in this case. In the cases of the DCI E-3 and the DCI E-4, a number of spatial multiplexing layers is 2 and $N_{CCE\_agg}$ is 1.

1) ACK or NACK information of data packets associated with layer 0 through layer ($N_{CCE\_agg}-1$) of the E-PDCCH may be allocated to the PUCCH based on Equation 4.

$$n_{PUCCH,0}^{(1)}=n_{CCE}+N_{PUCCH}^{(1)}+l(l=0,\ldots,N_{CCE\_agg}-1) \quad \text{[Equation 4]}$$

2) ACK or NACK information of data packets associated with a layer $N_{CCE\_agg}$ through a layer ($N_{SMDA}-1$) of the E-PDCCH may be allocated to the PUCCH based on Equation 5.

$$n_{PUCCH,0}^{(1)}=n_{CCE}+N_{PUCCH}^{(1)}+l+N_{offset}(l=0,\ldots,N_{CCE\_agg}-1) \quad \text{[Equation 5]}$$

In this example, ACK or NACK information of a data packet associated with the DCI E-3 is allocated to $n^{(1)}_{PUCCH}=27$. Also, ACK or NACK information of a data packet associated with the DCI E-4 is allocated to $n^{(1)}_{PUCCH}=30$ that is a closest resource area to $n^{(1)}_{PUCCH}=28$ from among the unallocated resource areas of the PUCCH. In this example, $N_{offset}$ of the data packet associated the DCI E-4 may be 2.

Based on the foregoing method, ACK or NACK may be effectively allocated using empty resource areas of the PUCCH, when $N_{CCE\_agg}$ is greater than or equal to 2.

The examples described herein may also be applicable to a combination of method 2 and method 3, and thus, further description thereof is omitted for conciseness.

Figure 11:
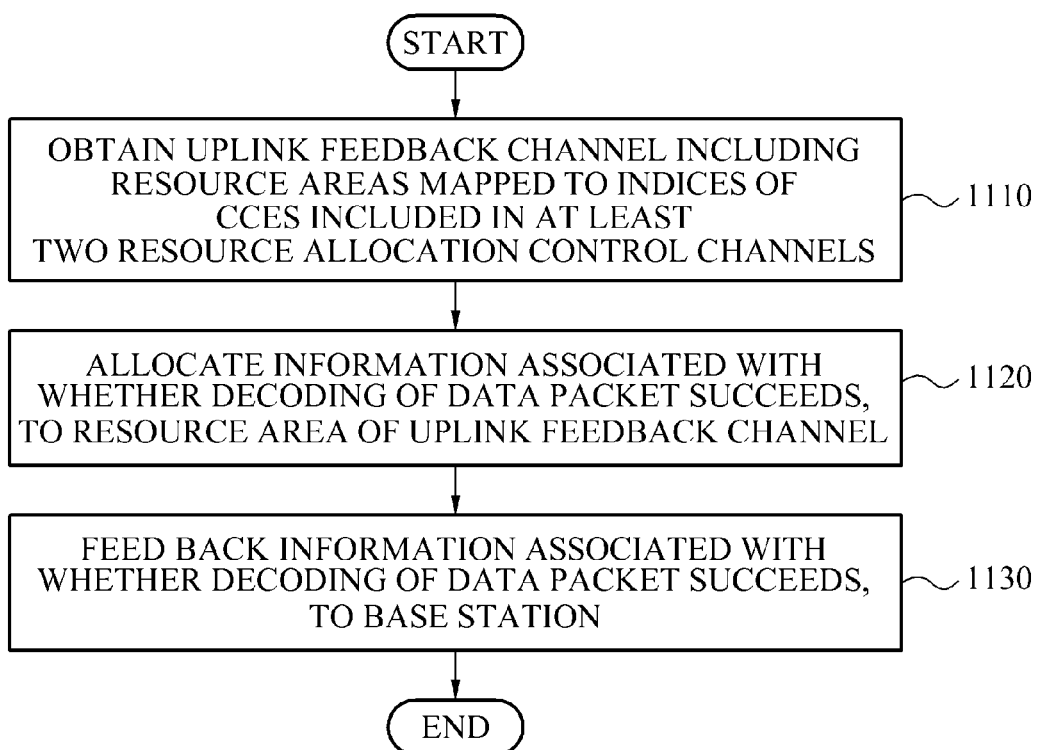
FIG. 11 is a flowchart illustrating an example of a communication method of a terminal that feeds back information about whether data packets were successfully decoded.

FIG. 11 illustrates an example of a communication method of a terminal that feeds back information about whether data packets were successfully decoded.

Referring to FIG. 11, the terminal obtains an uplink feedback channel including resource areas respectively mapped to indices of CCEs included in at least two different resource allocation control channels, in 1110. In this example, respective CCEs may have different indices.

The terminal allocates information associated with whether decoding of a data packet transmitted by a base station was successful to a resource area of the uplink feedback channel, in 1120.

The terminal feeds back information associated with whether the decoding of the data packet was successful, to the base station, using the resource area of the uplink feedback channel, in 1130.

Figure 12:
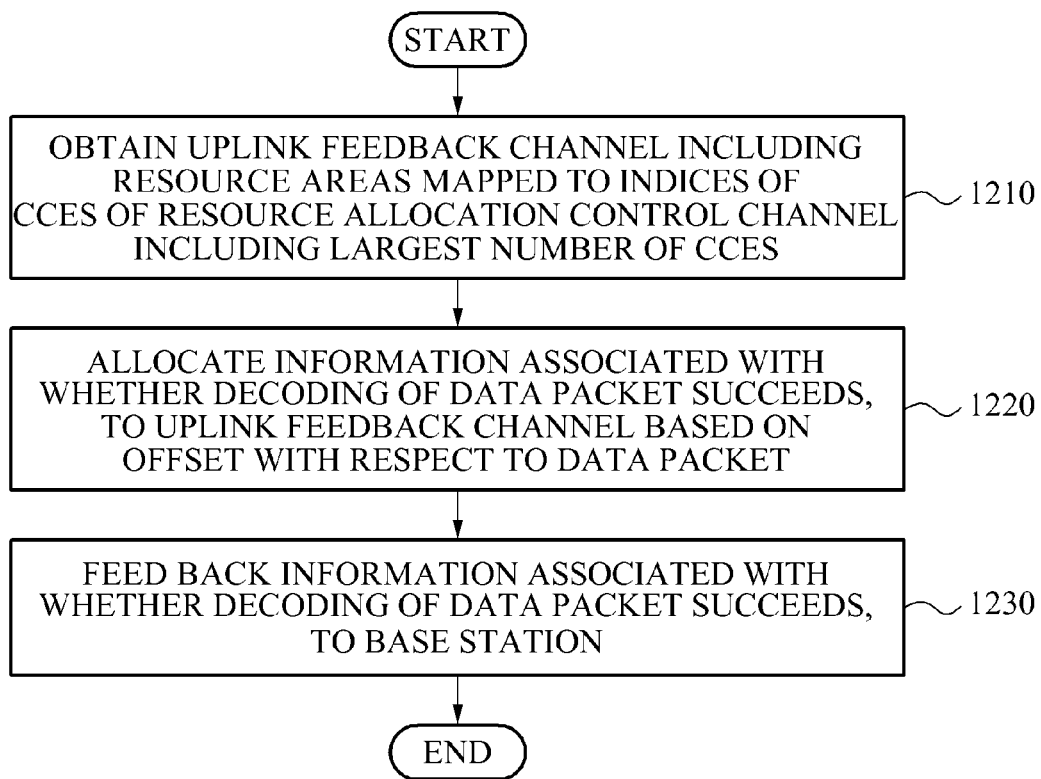
FIG. 12 is a flowchart illustrating another example of a communication method of a terminal that feeds back information about whether data packets were successfully decoded.

FIG. 12 illustrates another example of a communication method of a terminal that feeds back information about whether data packets were successfully decoded.

Referring to FIG. 12, the terminal obtains an uplink feedback channel including resource areas that are respectively mapped to indices of CCEs of a resource allocation control channel that has a largest CCEs from among at least two different resource allocation control channels, in 1210. In this example, each of the resource allocation control channels includes a plurality of CCEs of which indices are sequential from 1 to a number of CCEs included in a corresponding resource allocation control channel.

The terminal allocates information associated with whether decoding of a data packet transmitted by a base station was successful, to a resource area of the uplink feedback channel, based on $N_{offset}$ of the data packet and an initial index from among indices of at least one CCE included in a CCE aggregation to which control information with respect to the data packet is transmitted, in 1220.

The terminal feeds back information associated with whether the decoding of the data packet was successful, using the uplink feedback channel, in 1230.

Figure 13:
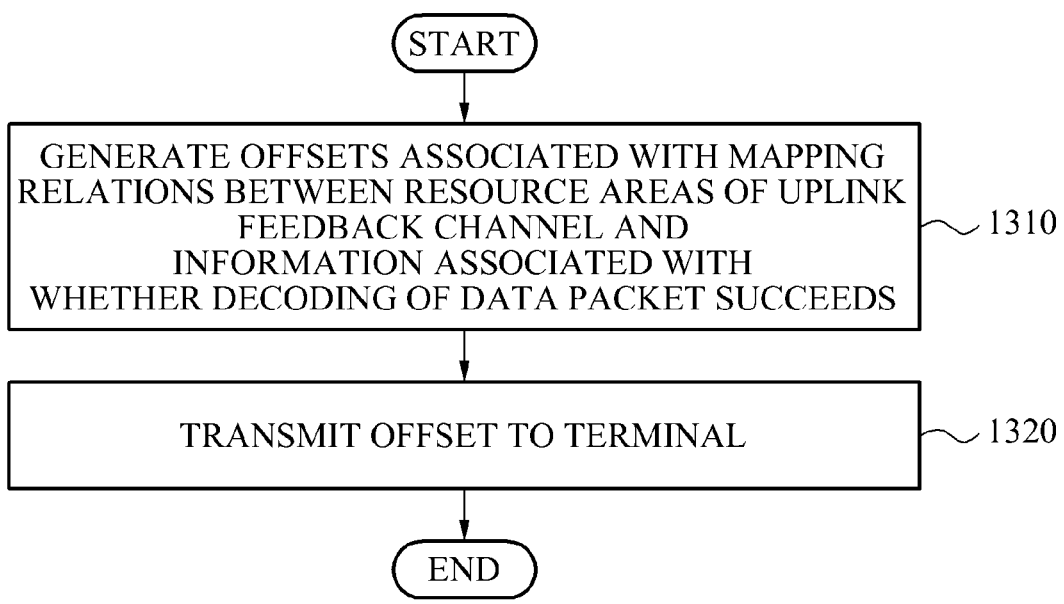
FIG. 13 is a flowchart illustrating an example of a communication method of a base station that transmits control information with respect to data packets.

FIG. 13 illustrates an example of a communication method of a base station that transmits control information with respect to data packets. In this example, the base station transmits control information using a first resource allocation control channel and a second resource allocation control channel, in a wireless communication system.

Referring to FIG. 13, a base station generates offsets with respect to mapping relations between resource areas of the uplink feedback channel and information associated with whether decoding of data packets associated with a second resource allocation control channel succeeds, in 1310, to enable i) resource areas of the uplink feedback channel, which are for feedback of a terminal to use to indicate whether decoding of data packets associated with a first resource allocation control channel was successful, and ii) resource areas of the uplink feedback channel, which are for feedback of the terminal to use to indicate whether decoding of the data packets associated with the second resource allocation control channel was successful, to not overlap each other.

The base station transmits the offsets to the terminal, in 1320. In this example, the base station may transmit each offset to the terminal, based on a CCE aggregation to which a corresponding data packet is allocated.

A communication method of a base station and a terminal for feedback of information associated with whether decoding of data packets succeeds has been described. Example embodiments described with reference to FIGS. 1 through 10 may be applicable to the communication method of the base station and the terminal and thus, detailed descriptions thereof will be omitted.

Figure 14:
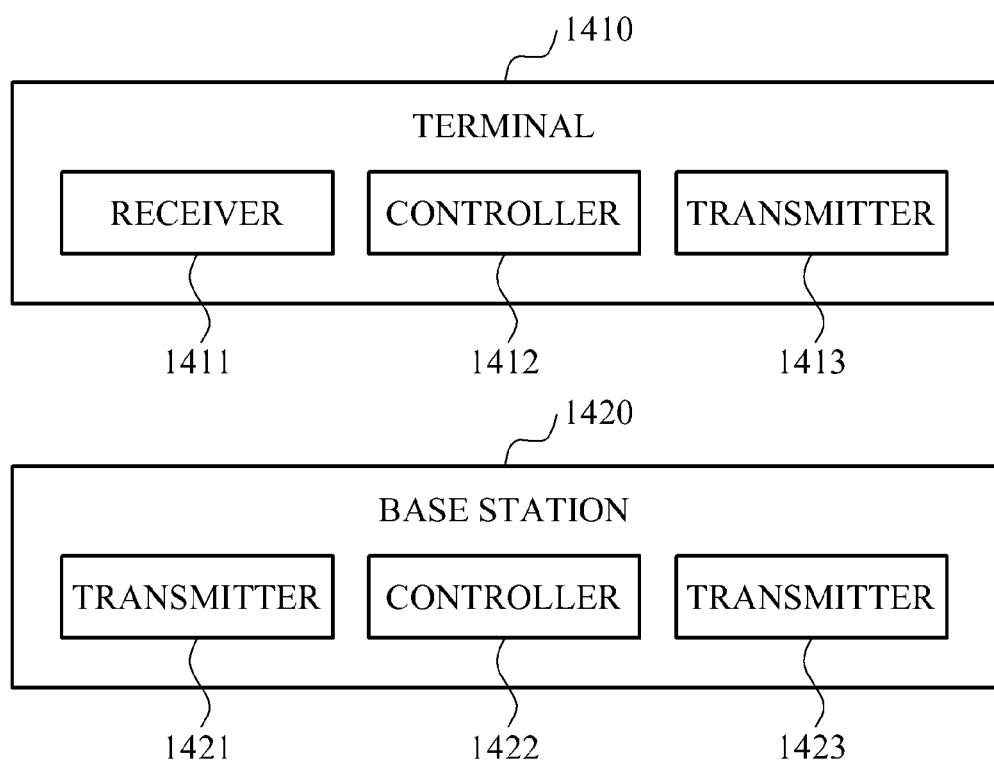
FIG. 14 illustrates an example of a terminal and a base station according to various aspects.

FIG. 14 illustrates an example of terminal and a base station.

Referring to FIG. 14, terminal 1410 includes a receiver 1411, a controller 1412, and a transmitter 1413. Base station 1420 includes a transmitter 1421, a controller 1422, and a transmitter 1423. The terminal 1410 may receive information from the base station 1420 via a downlink channel and may feed back information to the base station 1420 via an uplink channel.

The controller 1422 of the base station 1420 may generate uplink channel information that identifies a method for the terminal 1410 to use to feed back data to the base station 1420. Examples of the method are previously described herein. The uplink channel information may be transmitted by the transmitter 1421 of the base station 1420 to the terminal 1410.

The receiver 1411 of the terminal 1410 may receive uplink channel information that includes resource areas that are mapped to indices of control channel elements (CCEs) included a downlink channel from the base station 1420.

The controller 1412 of the terminal may allocate acknowledgement information to the resource areas that are included in the uplink control channel. The acknowledgment information may be used to indicate whether a data packet received from the base station 1420 via the downlink channel was successfully decoded.

The transmitter 1413 of the terminal 1410 may feed back the acknowledgment information to the base station 1420 via the allocated resource areas of the uplink control channel. The receiver 1423 of the base station 1420 may receive the information fed back from the terminal 1410.

In various examples, the uplink control channel may comprise a physical uplink control channel (PUCCH) in a third generation partnership project (3GPP) long-term evolution (LTE) environment. The uplink channel comprises a plurality of resource areas that are one-to-one mapped to the indices of the CCEs included in the downlink channel.

The terminal 1410 may share the uplink channel with at least one other terminal (not shown), and the receiver 1411 may receive an offset from the base station 1420 to prevent the controller 1412 from allocating a resource area that is to be used by the at least one other terminal.

The receiver 1411 may receive a data packet from the base station 1420 via a physical downlink shared channel (PDSCH) of a downlink frame, may receive resource allocation information associated with the data packet via a physical downlink control channel (PDCCH), and the offset may be received in a downlink control information (DCI) field that is received via the PDCCH.

The examples described with reference to FIGS. 1-13 are also applicable to the terminal 1410 and the base station 1420 illustrated in FIG. 14. Further descriptions thereof are omitted here for conciseness.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a terminal, the method comprising:
   receiving control information including an offset and resource information of data;
   receiving the data based on the resource information;
   determining a resource of feedback information for the data based on the offset; and
   transmitting the feedback information using the resource,
   wherein the control information is received in an enhanced-physical downlink control channel (E-PDCCH).

2. The method of claim 1,
   wherein the determining of the resource of the feedback information comprises:
   determining the resource of the feedback information based on the following equation:

$$n_{PUCCH}^{(1)} = n_{CCE} + N_{PUCCH}^{(1)} + N_{offset}$$

wherein $n_{PUCCH}^{(1)}$ denotes the resource of a physical uplink control channel (PUCCH), $n_{CCE}$ denotes an index of a first control channel element (CCE) used for transmission of the control information, $N_{PUCCH}^{(1)}$ denotes a second value related to a higher layer, and $N_{offset}$ denotes the offset.

3. The method of claim 1, wherein the determining of the resource of the feedback information comprises:
   determining the resource of the feedback information based on the following equation:

$$n_{PUCCH,0}^{(1)} = n_{CCE} + N_{PUCCH}^{(1)} + l + N_{offset}$$

wherein $n_{PUCCH,0}^{(1)}$ denotes the resource of a physical uplink control channel (PUCCH), $n_{CCE}$ denotes an index of a first control channel element (CCE) used for transmission of the control information, $N_{PUCCH}^{(1)}$ denotes a second value related to a higher layer, $l$ denotes a fixed constant, and $N_{offset}$ denotes the offset.

4. The method of claim 1, wherein the offset is included in an offset field of the control information.

5. The method of claim 1, wherein the feedback information comprises acknowledgement (ACK)/negative acknowledgement (NACK) information.

6. A communication method of a base station, the method comprising:
   transmitting control information including an offset and resource information of data;
   transmitting the data; and
   receiving feedback information for the data,
   wherein a resource of the feedback information is determined based on the offset,
   wherein the control information is transmitted in an enhanced-physical downlink control channel (E-PDCCH).

7. The method of claim 6, wherein the resource of the feedback information is determined based on the following equation:

$$n_{PUCCH}^{(1)} = n_{CCE} + N_{PUCCH}^{(1)} + N_{offset}$$

wherein $n_{PUCCH}^{(1)}$ denotes the resource of a physical uplink control channel (PUCCH), $n_{CCE}$ denotes an index of a first control channel element (CCE) used for transmission of the control information, $N_{PUCCH}^{(1)}$ denotes a second value related to a higher layer, and $N_{offset}$ denotes the offset.

8. The method of claim 6, wherein the resource of the feedback information is determined based on the following equation:

$$n_{PUCCH,0}^{(1)} = n_{CCE} + N_{PUCCH}^{(1)} + l + N_{offset} \qquad \text{[Equation 1]}$$

wherein $n_{PUCCH,0}^{(1)}$ denotes the resource of a physical uplink control channel (PUCCH), $n_{CCE}$ denotes an index of a first control channel element (CCE) used for transmission of the control information, $N_{PUCCH}^{(1)}$ denotes a second value related to a higher layer, $l$ denotes a fixed constant, and $N_{offset}$ denotes the offset.

9. The method of claim 6, wherein the offset is included in an offset field of the control information.

10. The method of claim 6, wherein the feedback information comprises acknowledgement (ACK)/negative acknowledgement (NACK) information.

11. A terminal comprising:
a receiver configured to receive control information including an offset and resource information of data, and to receive the data based on the resource information;
a controller configured to determine a resource of feedback information for the data based on the offset; and
a transmitter configured to transmit the feedback information using the resource,
wherein the control information is received in an enhanced-physical downlink control channel (E-PDCCH).

12. The terminal of claim 11, wherein the controller determines the resource of the feedback information based on the following equation:

$$n_{PUCCH}^{(1)} = n_{CCE} + N_{PUCCH}^{(1)} + N_{offset}$$

wherein $N^{(1)}_{PUCCH}$ denotes the resource of a physical uplink control channel (PUCCH), $n_{CCE}$ denotes an index of a first control channel element (CCE) used for transmission of the control information, $N^{(1)}_{PUCCH}$ denotes a second value related to a higher layer, and $N_{offset}$ denotes the offset.

13. The terminal of claim 11, wherein the controller determines the resource of the feedback information based on the following equation:

$$n_{PUCCH,0}^{(1)} = n_{CCE} + N_{PUCCH}^{(1)} + l + N_{offset}$$

wherein $n^{(1)}_{PUCCH,0}$ denotes the resource of a physical uplink control channel (PUCCH), $n_{CCE}$ denotes an index of a first control channel element (CCE) used for transmission of the control information, $N^{(1)}_{PUCCH}$ denotes a second value related to a higher layer, l denotes a fixed constant, and $N_{offset}$ denotes the offset.

14. The terminal of claim 11, wherein the offset is included in an offset field of the control information.

15. The terminal of claim 11, wherein the feedback information comprises acknowledgement (ACK)/negative acknowledgement (NACK) information.

16. A base station comprising:
a transmitter configured to transmit control information including an offset and resource information of data, and to transmit the data; and
a receiver configured to receive feedback information for the data;
wherein a resource for the feedback information is determined based on the offset,
wherein the control information is received in an enhanced-physical downlink control channel (E-PDCCH).

17. The base station of claim 16, wherein the resource of the feedback information is determined based on the following equation:

$$n_{PUCCH}^{(1)} = n_{CCE} + N_{PUCCH}^{(1)} + N_{offset}$$

wherein $N^{(1)}_{PUCCH}$ denotes the resource of a physical uplink control channel (PUCCH), $n_{CCE}$ denotes an index of a first control channel element (CCE) used for transmission of the control information, $N^{(1)}_{PUCCH}$ denotes a second value related to a higher layer, and $N_{offset}$ denotes the offset.

18. The base station of claim 16, wherein the resource of the feedback information is determined based on the following equation:

$$n_{PUCCH,0}^{(1)} = n_{CCE} + N_{PUCCH}^{(1)} + l + N_{offset}$$

wherein $n^{(1)}_{PUCCH,0}$ denotes the resource of a physical uplink control channel (PUCCH), $n_{CCE}$ denotes an index of a first control channel element (CCE) used for transmission of the control information, $N^{(1)}_{PUCCH}$ denotes a second value related to a higher layer, l denotes a fixed constant, and $N_{offset}$ denotes the offset.

19. The base station of claim 16, wherein the offset is included in an offset field of the control information.

20. The base station of claim 16, wherein the feedback information comprises acknowledgement (ACK)/negative acknowledgement (NACK) information.

* * * * *